United States Patent
Suzuki et al.

(10) Patent No.: US 6,487,883 B2
(45) Date of Patent: *Dec. 3, 2002

(54) SHIFT LEVER APPARATUS

(75) Inventors: Kenji Suzuki, Aichi-ken (JP); Noriyasu Syamoto, Aichi-ken (JP)

(73) Assignee: Kabushiki Kaisha Tokai-Rika-Denki-Seisakusho, Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/497,196

(22) Filed: Feb. 3, 2000

(65) Prior Publication Data

US 2002/0116966 A1 Aug. 29, 2002

(30) Foreign Application Priority Data

Feb. 9, 1999 (JP) .......................................... 11-031881

(51) Int. Cl.⁷ ............................................... B60R 25/06
(52) U.S. Cl. .............................. 70/247; 70/252; 477/99
(58) Field of Search .......................... 70/247, 252, 429, 70/237, 389, 248, 245, 246, 251, 256, 257; 477/99; 74/473.25; 192/220.4

(56) References Cited

U.S. PATENT DOCUMENTS

| | | | | |
|---|---|---|---|---|
| 4,096,717 A | * | 6/1978 | Cymbal ........................ 70/248 |
| 4,679,417 A | * | 7/1987 | Van Cise, Jr. ................. 70/247 |
| 4,759,203 A | * | 7/1988 | Lieb et al. ................. 70/252 X |
| 4,821,605 A | * | 4/1989 | Dzioba ..................... 70/248 X |
| 4,854,193 A | * | 8/1989 | Newman et al. ......... 70/248 X |
| 4,905,802 A | * | 3/1990 | Gotoh ....................... 70/247 X |
| 5,050,411 A | * | 9/1991 | Kawachi et al. .............. 70/248 |
| 5,197,312 A | * | 3/1993 | Akutsu ......................... 70/247 |
| 5,226,303 A | * | 7/1993 | Dieden et al. ................. 70/247 |
| 5,309,744 A | * | 5/1994 | Kito et al. .................... 70/247 |
| 5,566,583 A | * | 10/1996 | Suzuki ..................... 70/247 X |
| 5,651,290 A | * | 7/1997 | Osboru et al. ........... 70/247 X |
| 5,794,469 A | * | 8/1998 | Sukuki ..................... 70/247 X |
| 5,857,938 A | * | 1/1999 | Porter ...................... 70/247 X |
| 5,860,303 A | * | 1/1999 | Droz et al. .................. 70/247 |
| 5,902,209 A | * | 5/1999 | Moody ..................... 70/247 X |
| 5,906,120 A | * | 5/1999 | Thacker et al. ............... 70/186 |
| 5,913,909 A | * | 6/1999 | Schwab ....................... 72/247 |
| 5,954,616 A | * | 9/1999 | Snell et al. ............... 70/248 X |
| 6,176,809 B1 | * | 1/2001 | Visser et al. ............. 70/247 X |
| 6,295,887 B1 | * | 10/2001 | DeJonge et al. .......... 70/248 X |

* cited by examiner

*Primary Examiner*—Lloyd A. Gall
(74) *Attorney, Agent, or Firm*—Nixon Peabody LLP; Thomas W. Cole (57) ABSTRACT

The present invention provides a shift lever apparatus which shifts a shift lever connected to a transmission of a vehicle, and thereby, changes a shift range to a specific shift range from among a plurality of shift ranges preset in the transmission corresponding to the position to which the shift lever has been shifted, comprising: a key device which is provided at a side the shift lever and adjacent to the shift lever, and which holds an ignition key inserted therein so that the ignition key is rotatable, and restricts the removal of the ignition key at a rotation position other than a predetermined removal position; and a lock link which restricts the rotation of the ignition key to the removal position in the key device, and is displaced by a predetermined operation of the shift lever at a specific shift position corresponding to a specific shift range from among the plurality of shift ranges so as to release the restriction of the rotation of the ignition key.

19 Claims, 6 Drawing Sheets

SHIFT LEVER APPARATUS

BACKGROUND OF THE INVENTION

1. Field of the Invention

The present invention relates to a shift lever apparatus which is mounted in a vehicle in order to change a shift range of a transmission.

2. Description of the Related Art

Among apparatuses for shifting between a plurality of shift ranges preset in an automatic transmission of a vehicle, there is a shift lever apparatus which rotates a shift lever mechanically connected to the automatic transmission so as to shift the shift lever to a shift range corresponding to the rotation position (shift position).

Moreover, this type of shift lever apparatus is provided with a so-called key interlock mechanism. The key interlock mechanism only enables the removal of an ignition key from a key cylinder into which it has been inserted when the shift lever is shifted to a shift position corresponding to a parking range which is a shift range for locking the wheels of a vehicle (hereinafter, this shift position is referred to as "P position", for convenience of explanation).

More specifically, the key interlock mechanism is provided in the key cylinder, and includes: a cam which is rotated together with the rotation of the ignition key inserted into the key cylinder; and a lock member which is provided so as to be able to reciprocate between a lock position on the locus of rotation of the cam and a lock release position separated from the lock position. If the ignition key is positioned at a rotation position other than a position enabling the removal of the ignition key from the key cylinder, and if the shift lever is positioned at a shift position other than the "P position", the aforesaid lock member is positioned on the locus of rotation of the cam so as to restrict the rotation of the cam by a rotation of the ignition key to a position allowing the removal of the ignition key from the key cylinder. Then, when the shift lever is shifted to the "P position" from the aforesaid state, the lock member is separated from the locus of rotation of the cam so that the ignition key can be rotated to a position allowing the removal of the ignition key from the key cylinder.

In general, mechanical type mechanisms and electrical type mechanisms are used for moving the lock member.

Mechanical type mechanisms include a cam follower which is displaced by being directly or indirectly pressed by a shift lever being shifted to the "P position", and a cable connecting the cam follower and the lock member. When the shift lever moves the cam follower as it is shifted to the "P position", the cam follower operates and moves the lock member via the cable.

On the other hand, the electrical type mechanism includes a solenoid for moving the lock member by magnetic force, a control device such as a computer for controlling the solenoid, and a switch for detecting that the shift lever has been shifted to the "P position". When the switch detects that the shift lever has been shifted to the "P position", the control device energizes the solenoid or terminates the flow of current to the solenoid, thus enabling the lock member to be moved.

Note that, in general, the shift lever apparatus is provided between a driver's seat and a passenger seat of a vehicle, while the key cylinder is provided in a steering column cover separated from the position of the shift lever apparatus. For this reason, in a mechanical type key interlock mechanism, there is a need to secure space for arranging cables, and the task of arranging the cables is complicated. In addition, adjustment is required when the cables are being arranged so that the mechanism will definitely operate. In contrast, an electrical type key interlock mechanism has none of the problems described above. However, in the electrical type key interlock mechanism the individual constituent members and devices are expensive causing the overall cost to be increased.

SUMMARY OF THE INVENTION

In view of the above, the object of the present invention is to provide a low cost shift lever apparatus equipped with a key interlock mechanism.

To achieve the above object, the present invention is a shift lever apparatus for shifting a shift lever connected to a vehicle transmission into a shift range from among a plurality of set shift ranges in the vehicle transmission which corresponds to a position to which the shift lever has been moved by a manual shift operation comprising a key device which is provided adjacent to a side of the shift lever and holds an ignition key which has been inserted inside the key device and can be operated by being rotated, and which key device restricts removal of the ignition key other than at a predetermined removal position, and a lock link which restricts rotation of the ignition key to a removal position inside the key device, as well as releases the restriction on the rotation of the ignition key when displaced by a predetermined operation of the shift lever occurring at a specific shift position corresponding to a specific shift range from among the plurality of shift ranges.

In the shift lever apparatus having the structure as described above, when the shift lever is positioned in a shift position other than a specific shift position corresponding to a specific shift range from among the plurality of shift ranges set in the transmission (e.g., a parking range in which the transmission of driving force to a driving wheel of a vehicle is cut off and the driving wheel is locked), the lock link directly or indirectly prevents the rotation of the ignition key to the extraction position inside the key device. Therefore, in this state, it is impossible to extract the ignition key from the key device (key interlock), and, for example, by extracting the ignition key from the key device, the key device is made unable to lock a steering wheel which forms part of the steering unit (Note that this steering lock mechanism is not an indispensable element in the present invention, and is merely used as an example).

When the shift lever is manually shifted to a specific shift position from the aforesaid state, and a predetermined operation of the shift lever is carried out, the lock link is displaced so as to release the restriction of rotation of the ignition key by the lock link. In this state, by rotating the ignition key to the extraction position, it becomes possible to extract the ignition key from the key device For example, if the aforesaid steering lock mechanism is interlocked with the key device, by extracting the ignition key from the key device, it is possible to lock the steering wheel.

As described above, in the present invention, the lock link restricts the rotation of the ignition key to the extraction position by an engagement of engaging members provided in the shift lever, and releases the restriction of the rotation by releasing the engagement of the engaging members. In addition, because the key cylinder is provided at a side of the shift lever, there is no need to provide cables between the shift lever apparatus and the key cylinder as in a conventional shift lever apparatus. Thus, it is possible to dispense with troublesome tasks such as having to adjust the cables when assembling the conventional shift lever apparatus. Further, basically, the only component constituting the key interlock mechanism is the lock link; therefore, a cost reduction can be achieved.

Moreover, by providing the key cylinder and the shift lever in close proximity to each other, the key cylinder and the shift lever can be constituted as a unit (provided as an assembled part). Therefore, mounting the key cylinder and shift lever on a vehicle is made easier.

Note that, in a conventional shift lever apparatus, a manual operation to rotate the shift lever taking the transverse direction of the vehicle as the axial direction is called a shift operation, and an operation to rotate the shift lever with the longitudinal direction of the vehicle as the axial direction is called a select operation. However, in the present invention, the term "shift operation" is not limited to an operation to rotate the shift lever using the transverse direction of the vehicle as the axial direction. Namely, the operation of changing the transmission shift range is called a shift operation regardless of the direction and type of movement of the shift lever.

Accordingly, for example, a shift lever shift operation of what is known as a gate-type shift lever apparatus for changing the shift range of a transmission by moving the shift lever in a zigzag direction in the longitudinal and transverse directions of the vehicle is also categorized as a "shift operation".

Further, the present invention is preferably the shift lever apparatus further comprising a detent pin connectable to the shift lever so as to protrude therefrom towards the key device side, which detent pin is able to move integrally with the shift lever in the manual shift operation direction, and which detent pin moves in a direction orthogonal to the manual shift operation direction when a predetermined release operation is carried out, and a detent section interposed between the shift lever and the key device, in which is formed a detent hole into which the distal end of the detent pin is inserted, with a restricting section formed inside the detent hole for restricting movement of the detent pin by abutting the detent pin on the locus of the movement of the detent pin which accompanies a manual shift operation of the shift lever to the specific shift position and restricts movement of the detent pin, and which restricting section is able to be avoided by the detent pin via a specific release operation, wherein, when the shift lever is positioned in a specific shift position, the detent pin, having avoided the restricting means, engages with the lock link when the detent pin returns to a state before the release operation was performed, and displaces the lock link to a position at which the restriction on the rotation of the ignition key is released.

In the shift lever apparatus having the structure described above, when the shift lever is manually shifted to a specific shift position, the detent pin provided in the shift lever abuts against the restricting portion formed in the inner peripheral portion of the detent opening of the detent portion so as to restrict movement of the detent pin accompanying the shift operation of the shift lever. Whereby the shift operation of the shift lever to the specific shift position is indirectly restricted by the restricting portion via the detent pin, and thus, it is possible to restrict a careless shift operation to the specific shift position.

In this state, when a predetermined release operation is carried out, the detent pin is moved to a position capable of avoiding the restricting portion toward a direction intersecting-with respect to the shifting direction. Therefore, in this state, the restriction of shift operation by the restricting portion is released, and thus, the shift lever can be shifted to the specific shift position.

Subsequently, in this state, when the aforesaid predetermined release operation is further released so as to return the detent pin to a state before the predetermined release operation is carried out, the detent pin is engaged with the lock link so as to displace the lock link, and then, a restriction of rotation of the ignition key by the lock link is released. In this state, the ignition key is rotated to the removal position, and thereby, it is possible to pull out the ignition key from the key device.

According to the present invention, preferably, the shift lever apparatus includes a base member which is provided with the key device, and supports the shift lever so as to shift the shift lever, and further, is formed with the detent portion.

In the shift lever apparatus having the construction as described above, the base member is provided with the key device, and the shift lever is supported to the base member, and further, the aforesaid detent portion is formed in the base member. Namely, in the present invention, the shift lever, the key device and the detent portion are integrally assembled by the base member. Therefore, it is possible to perform an adjustment for the lock link and the detent pin before mounting these members to a vehicle; as a result, assembly of these members to a vehicle can be readily performed.

DESCRIPTION OF THE PREFERRED EMBODIMENTS

Figure 1:
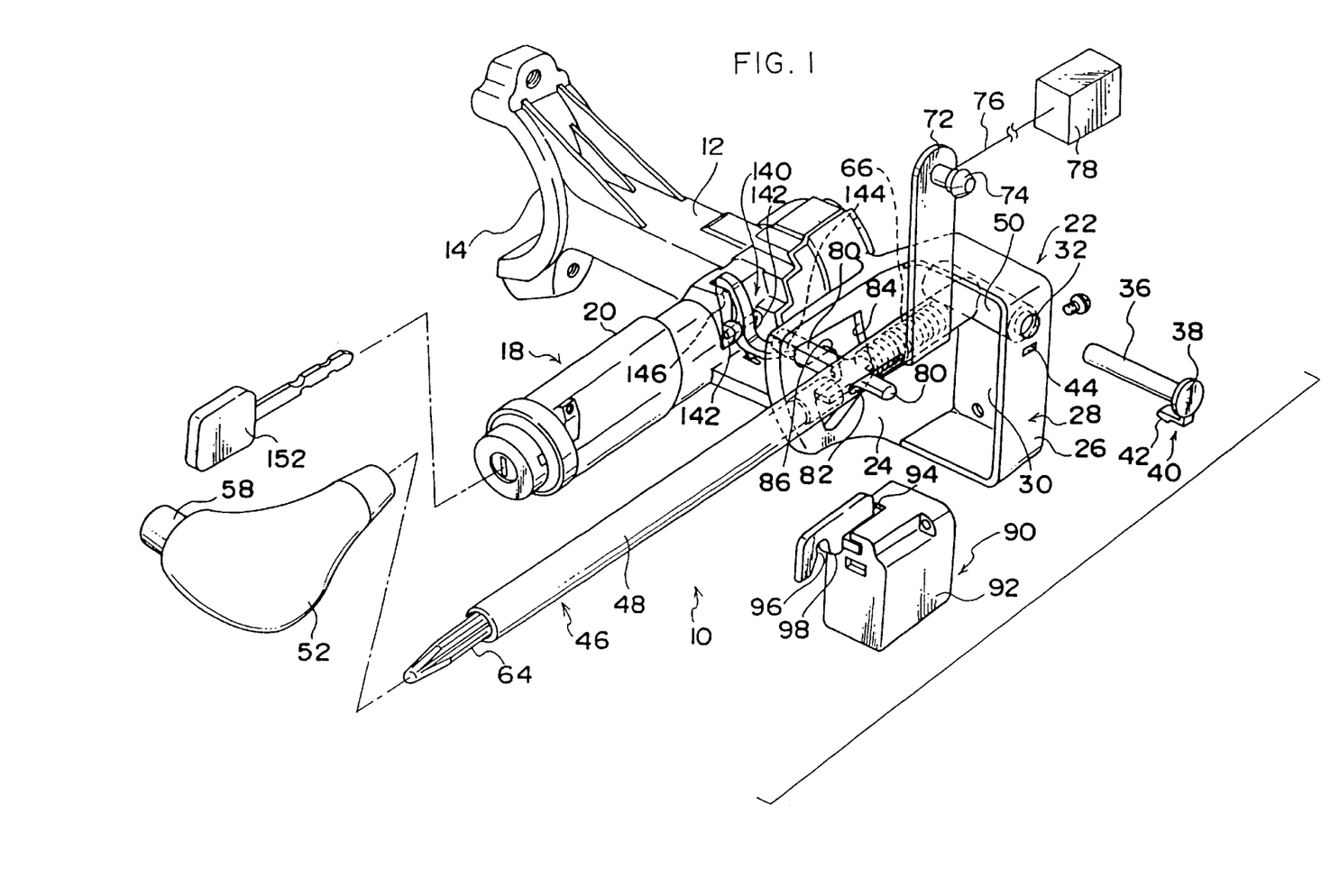
FIG. 1 is a perspective view showing a shift lever apparatus according to an embodiment of the present invention.

FIG. 1 shows a perspective view of a shift lever apparatus 10 according to an embodiment of the present invention.

As shown in FIG. 1, the shift lever apparatus 10 includes a base member 12. The base member 12 is formed in a block shape with the length thereof extending in the transverse direction of the vehicle. A concave fixed portion 14 which is open to face substantially towards the left side of the vehicle is formed at one end in the longitudinal direction of the base member 12. The radius of curvature of the inner peripheral portion of the fixed portion 14 corresponds to the radius of curvature of the outer peripheral portion of an upper tube (not shown) housing a steering shaft (not shown). The fixed portion 14 is supported by being fastened to the upper tube by fastening means (not shown) such as bolts in a state where the inner peripheral portion of the fixed portion 14 abuts the outer peripheral portion of the upper tube.

A key cylinder 20 constituting a key device 18 is provided at a side opposite to the fixed portion 14 of the base member 12. A shift lever supporting portion 22 is provided at a side of the base member 12 further from the fixed portion 14 than the key cylinder 20. The shift lever supporting portion 22 is fixed integrally to an outer peripheral portion of the key cylinder 20 by welding or the like, and thus constitutes a portion of the base member 12.

In the shift lever supporting portion 22, a pair of supporting walls 24 and 26 are disposed facing each other along a transverse vehicle direction, and constitute a portion of an outer peripheral wall 28. Further, the shift lever supporting portion 22 is formed substantially in a box shape with the end portion on the side substantially closest to the front of the vehicle of the outer peripheral wall 28 closed off by a bottom wall 30. A through hole 32 coaxially penetrates the supporting walls 24 and 26 (although a through hole is formed in the supporting wall 24, it is not shown in the figure). A cylindrical shaft 36 is inserted through the through hole 32 so as to extend between the supporting wall 26 and the outer peripheral wall 28.

A flange portion 38 is formed in the end portion of the shaft 36 on the side in the longitudinal direction corresponding to the through hole 32 on the supporting wall 26 side. The flange portion 38 has an outer diametrical dimension larger than that of the main body of the shaft 36. When the shaft 36 is inserted through the through hole 32, the flange portion 38 abuts against the supporting wall 26. Moreover, the flange portion 38 is formed with a fixed portion 40. The portion from the proximal portion to the intermediate portion of the fixed portion 40 extends toward the outside in the radial direction of the flange portion 38. The fixed portion 40 is bent from the intermediate portion thereof so as to extend towards the distal end side (the side opposite to the flange portion 38 of the shaft 36) of the shaft 36 in parallel with the shaft 36. A pawl portion 42 is formed in the distal end portion of the fixed portion 40. The pawl portion 42 is formed in a taper shape such that its proximal portion is thicker than the main body of the fixed portion 40, and the pawl portion 42 gradually thins the closer to the distal end portion. A slit 44 which engages with the pawl portion 42 is formed in the supporting wall 26. The width of the slit 44 is larger than the thickness of the distal end of the pawl portion 42 and thinner than that of the proximal end of the pawl portion 42. The pawl portion 42 fits into the slit 44 so as to prevent the pawl portion 42 from coming loose, and thus to prevent a displacement along the axial direction of the shaft 36.

A lever main body 48 of a shift lever 46 is rotatably supported around the shaft 36 fixed to the shift lever supporting portion 22 in the manner described above. The lever main body 48 has mainly a longitudinally cylindrical shape extending substantially in the longitudinal direction of the vehicle. A cylindrical mounting portion 50 whose length extends in the transverse direction of the vehicle is formed in the proximal end portion of the lever main body 48, which is the end portion on the vehicle forward side. The shaft 36 inserted through the through hole 32 passes through the mounting portion 50 between the through hole 32 and the unillustrated through hole formed in the supporting wall 24, and thereby, the lever main body 48 is rotatably supported by the shaft 36. The distal end portion of the lever main body 48 on the side opposite to the mounting portion 50 is integrally attached to a manual operation knob 52.

Figure 4:
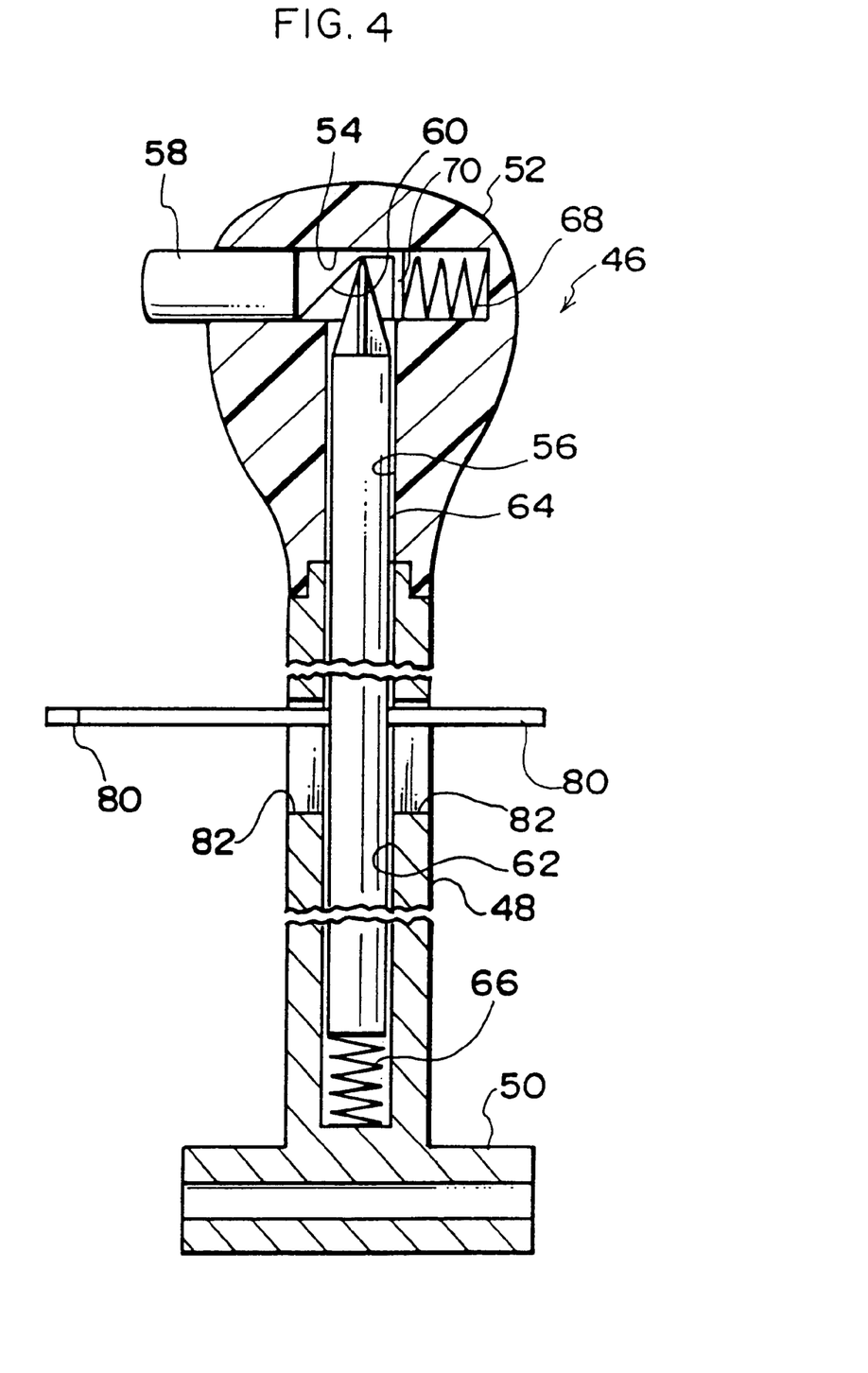
FIG. 4 is a cross sectional view showing an internal structure of the shift lever.

As shown in FIG. 4, the knob 52 is formed with a transverse hole 54 which is open at an end portion on the left-hand side of the vehicle, and a longitudinal hole 56 which has one end opening in an intermediate portion of the transverse hole 54 and the other end opening in an end portion of the knob 52 connected to the lever main body 48. A portion of a button 58 is housed in the transverse hole 54 so as to be movable inside the transverse hole 54. A cam portion 60 is formed at an end portion of the button 58 on the side housed in the transverse hole 54, and has an inclined surface sloping towards the front of the vehicle and towards the right-hand side of the vehicle. The cam portion 60 abuts against one end of a bar- shaped detent rod 64 which is housed in the longitudinal hole 56 and in a longitudinal hole 62 which is formed coaxially with the longitudinal hole 56 in the lever main body 48 and has one end open so as to communicate with the longitudinal hole 56. The detent rod 64 is slidable in the longitudinal direction of the lever main body 48 in the longitudinal hole 56 and the longitudinal hole 62, and is urged towards the knob 52 by a compressed coil spring 66 housed in the longitudinal hole 62 in the vicinity of the base portion of the lever 48, and thereby, the cam portion 60 is pressed substantially towards the rear of the vehicle. As described above, the cam portion 60 has an inclined surface sloping towards the front of the vehicle and towards the right-hand side of the vehicle. Therefore, a pressing force from the detent rod 64 acts in the direction in which the button 58 is pushed out from the transverse hole 54. In other words, when the button 58 is pressed manually towards the inside of the transverse hole 54, the cam portion 60 slides the detent rod 64 towards the base side of the lever main body 48 against the urging force of the compressed coil spring 66.

Moreover, a compressed coil spring 68 is provided in the vicinity of the bottom portion of the transverse hole 54, and urges the button 58 toward the open end side of the detent rod 64 via an arm 70 which extends from the cam portion 60 toward the bottom portion of the transverse hole 54.

Further, as shown in FIG. 1, a wire anchoring portion 72 is provided on the base end side of the lever main body 48. The wire anchoring portion 72 is basically formed as a long rectangular plate whose length extends in the vertical direction of the vehicle and whose sides face in the transverse direction of the vehicle. The bottom end portion of the wire anchoring portion 72 in its longitudinal direction is fastened integrally to an outer peripheral portion on the base end side of the lever main body 48 by welding or the like. The distal end portion of the wire anchoring portion 72 is formed with a pin 74 which protrudes towards the right-hand side of the vehicle, and one longitudinal end portion of a cable 76 is anchored by the pin 74.

The other longitudinal end portion of the cable 76 is connected to an automatic transmission 78 either directly or indirectly-via mechanical elements such as an arm, lever or the like (directly connected thereto in this embodiment). As the shift lever 46 rotates (shifts) around the shaft 36, the pin 74 is rotated around the shaft 36, thereby operating the automatic transmission 78. In addition, the shift lever 46 is shifted to a position which corresponds to the rotation position of a particular shift range out of the plurality of shift ranges set in the automatic transmission 78.

Furthermore, a detent pin 80 extends from a longitudinal intermediate portion of the aforesaid detent rod 64 substantially in the transverse direction of the vehicle. The detent pin 80 passes through an elongated hole 82 formed in the lever main body 48 and protrudes outside the lever main body 48. In this case, the elongated hole 82 is formed longitudinally along the length of the lever main body 48, so that the detent pin 80 can be moved from a state of abutting against one longitudinal end portion of the elongated hole 82 on the knob 52 side to a state of abutting against the other longitudinal end portion of the elongated hole 82 on the base end side of the lever main body 48. One distal end side of the detent pin 80 penetrates through a detent hole 84 which is formed in the supporting wall 24 as a detent portion. When an external force is not acting on the detent rod 64 against the urging force of the compressed coil spring 66, that is, when the detent pin 80 is situated at one end portion in the longitudinal direction of the elongated hole 82, then when the shift lever 46 is rotated around the shaft 36, the detent pin 80 is rotated along an inner peripheral portion of the elongated hole 82 on the rearward side of the vehicle.

Figure 5:
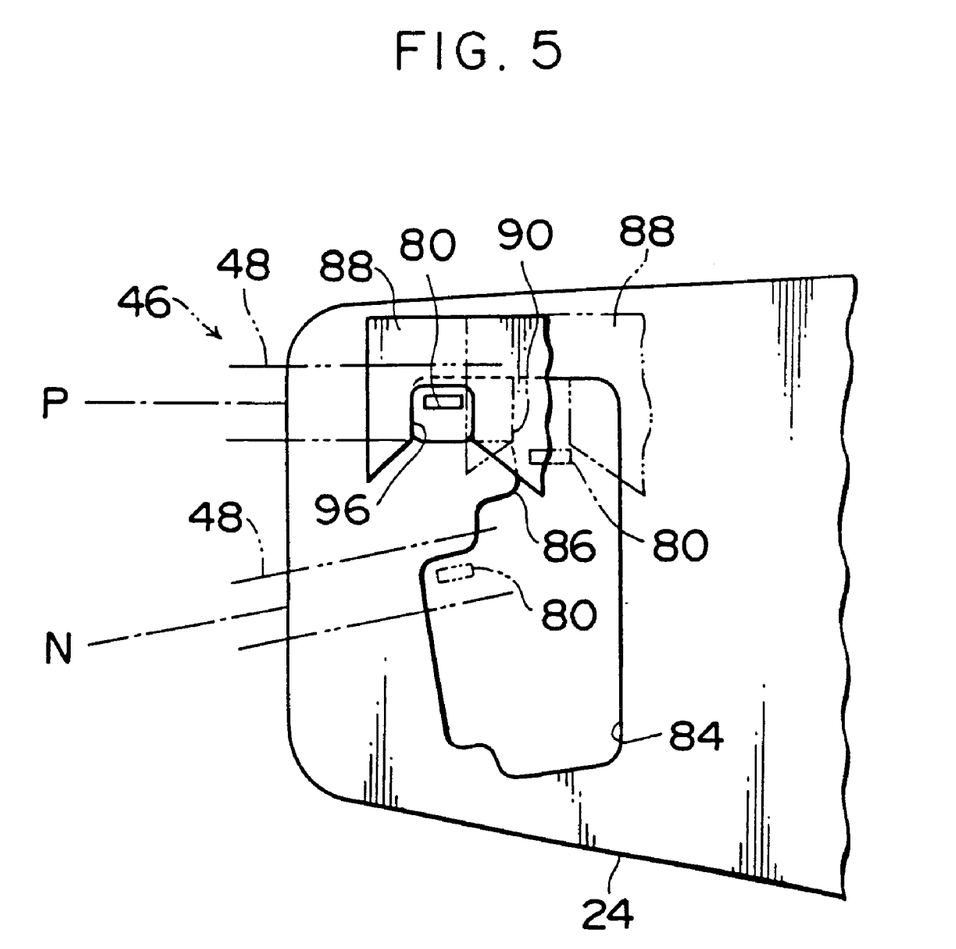
FIG. 5 is a side view showing a relationship between a restricting wall used as a restricting means, a shift lock plate which is a part of a shift lock means, and a detent pin used as an engaging member.

As shown in FIG. 5, a restricting wall 86 is formed as a restricting portion in the inner peripheral portion of the detent hole 84. When the detent pin 80 is situated at one end portion in the longitudinal direction of the elongated hole 82, the restricting wall 86 is provided on the locus of rotation of the detent pin 80 when the shift lever 46 is rotated (shifted) between shift positions of the plurality of shift ranges preset in the automatic transmission 78; more specifically, between a shift position corresponding to a parking range locking the driving wheel of vehicle (hereinafter, this shift position is referred to as "P position", for convenience of explanation), and a shift position corresponding to a neutral range in which the transmission of the driving force of the engine to the driving wheel is blocked allowing the driving wheel to rotate freely (hereinafter, this shift position is referred to as "N position", for convenience of explanation).

Further, a shift lock plate 88 is provided on the opposite side to the supporting wall 24 of the lever main body 48 when the lever main body 48 is situated in the "P position". The shift lock plate 88 is a plate-like member whose thickness direction runs in the vehicle transverse direction. Moreover, the shift lock plate 88 is mounted so that, when the shift lever 46 is in the "P position", the shift lock plate 88 is able to slide through a guide hole 94 formed in the case 92 of the shift lock solenoid (described below) in the direction of the urging force of the compressed coil spring 66 and in the direction in which the detent pin 80 moves against this urging force. Moreover, as shown in FIG. 5, the shift lock plate 88 is formed with a notch portion 96 whose opening faces substantially downwards. The width of the notch portion 96 is such that it is able to internally house the aforesaid detent pin 80. When the shift lever 46 is positioned in the "P position", the detent pin 80 enters the inside of the notch portion 96.

Further, the shift lock plate 88 is formed with a cam portion 98 at is side edge on the opening side of the notch portion 96. The cam portion 98 has an inclined surface sloping towards the bottom of the vehicle and towards the rear of the vehicle.

As shown in FIG. 1, the case 92 of the shift lock solenoid 90 is attached as a shift lock means to the inside of the outer peripheral wall 28, and fixed to the bottom wall 30 by fastening means such as bolts or the like.

Figure 6:
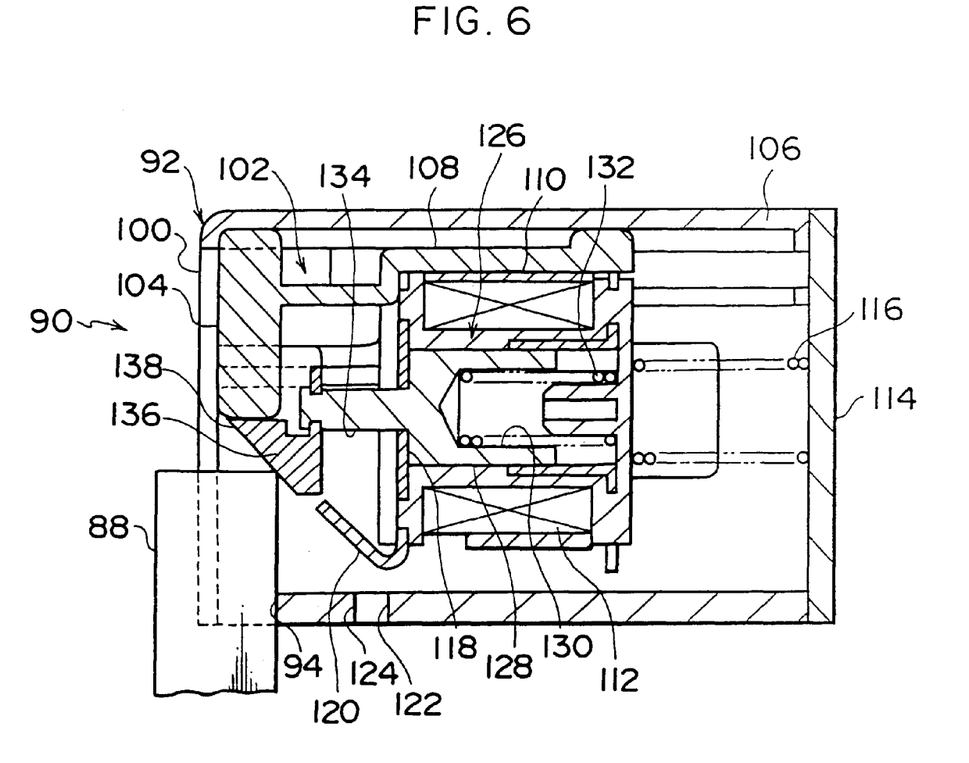
FIG. 6 is a cross sectional view showing a structure of a shift lock solenoid used as shift lock means.

As shown in FIG. 6, the guide hole 94 is formed in a side of the sidewall 100 constituting the case 92. The shift lock plate 88 enters into the inside of the case 92 through the guide hole 94. Moreover, a lock member 102 is housed in the case 92. The lock member 102 is formed having a rectangular block-shaped lock portion 104. When the lock portion 104 is abutted against the side wall 100, the lock portion 104 faces a portion of the shift lock plate 88 which enters into the case 92 along a longitudinal vehicle direction, and thus prevents the shift lock plate 88 from moving inside the case 92. Further, in the lock member 102, the lock portion 104 is able to slide along a side wall 106 of the case 92 from a state where it is abutted against the side wall 100. Furthermore, the lock member 102 is formed with a connecting portion 108, and is integrally fastened to an electromagnet 110. The electromagnet 110 is formed in a cylindrical shape. A coil 112 is wound around the outside of the electromagnet 110 so that when current is fed to the electromagnet 110, a magnetic force is generated from the inner side of the electromagnet 110 to the outside thereof. Moreover, the coil 112 is electrically connected either directly or indirectly to a shift lock computer which feeds current to the coil 112 when, for example, an unillustrated sensor or the like detects the depression of a brake pedal provided in the vehicle interior.

A tension coil spring 116 is arranged between the electromagnet 110 and a side wall 114 of the case 92 on the vehicle forward side so that the electromagnet 110 is constantly urged toward the rear of the vehicle. Therefore, the lock portion 104 of the lock member 102 integrally fastened to the electromagnet 110 constantly abuts against the side wall 100.

On the other hand, a cam plate 118 is provided on the vehicle rearward side of the electromagnet 110. The right-hand side in the transverse direction of the vehicle of the cam plate 118 is folded towards the rear of the vehicle, and the end portion also inclines towards the left-hand side in the transverse direction of the vehicle, closer the rear edge of the cam plate 118. This portion of the cam plate 118 forms a cam portion 120. The cam portion 120 corresponds to a guide hole 122 formed at a side of the guide hole 94. When a forcible release lever (not shown) inside the guide hole 122 is moved into the case 92 by an operating force of a vehicle passenger, the cam portion 120 is pressed by the forcible release lever, and then, the electromagnet 110 is moved downwards against the urging force of the tension coil spring 116 regardless of whether or not current is being fed to the coil 112, and thus the lock member 102 is moved downwards.

In the electromagnet 110, a main body 128 of a plunger 126 is provided so as to be slidable in the vertical direction of the vehicle. In this case, the plunger 126 is formed of a metallic material, and when a current flows through the coil 112, an inner wall of the electromagnet 110 is magnetized. Whereby the main body 128 is attracted to the inner wall of the electromagnet 110. The main body 128 is formed with a hole 130 which is opened towards the bottom of the vehicle, and a tension coil spring 132 is housed in the hole 130. One end of the tension coil spring 132 abuts against the bottom portion of the hole 130 and the other end abuts against the bottom portion of the electromagnet 110, and urges the main body 128 towards the top of the vehicle with respect to the electromagnet 110. In this case, the urging force of the tension coil spring 132 is set so as to be smaller than the urging force of the tension coil spring 116. Moreover, the combined force of the urging force of the tension coil spring 116 and the attraction force attracting the plunger 126 (main body 128) of the electromagnet 110 in an excited state, is set to be larger than the urging force of the tension coil spring 116.

On the other hand, a protruding portion 134 having an outer diameter smaller than the main body 128 is formed protruding coaxially from a closed end of the main body 128 of the plunger 126. The protruding portion 134 penetrates the cam plate 118 so as to protrude outside the electromagnet 110. The distal end of the protruding portion 134 is attached to a cam member 136. The cam member 136 has a trapezoidal shaped cross section, and an end portion 138 of the cam member 136 on the vehicle top side is formed into an inclined surface which slopes towards the rear of the vehicle. Further, when the lock portion 104 is abutted against the side wall 100 of the case 92 by the urging force of the tension coil spring 132 and the main body 128 of the plunger 126 is abutted against the cam plate 118 by the urging force of the tension coil spring 116, the cam member 136 is interposed between the lock portion 104 of the lock member 102 and the shift lock plate 88, and the end portion 138 of the cam member 136 faces the shift lock plate 88. Therefore, when the shift lock plate 88 moves into the case 92, the end portion 138 of the cam member 136 is pressed by the shift lock plate 88 and is moved towards the bottom of the vehicle.

Meanwhile, as shown in FIG. 1, a key interlock link 140 functioning as a lock link is disposed between the key cylinder 20 and the supporting wall 24. The key interlock link 140 has an intermediate portion, which is supported by means of a supporting portion 142 formed on the outer peripheral portion of the key cylinder 20, so as to be freely rotatable in a predetermined range around an axis which has the longitudinal direction of the vehicle as the axial direction thereof. Further, one end side from the intermediate portion of the key interlock link 140 has an abutting portion 144 which extends in a direction in which it approaches close to the supporting wall 24 and is bent into a vehicle forward direction so as to be abutted against the detent pin 80. Moreover, the abutting portion 144 is positioned on the locus of movement of the detent pin 80 which accompanies the urging force of the compressed coil spring 66 and the sliding movement of the detent rod 64 against this urging force when the shift lever 46 has been manually placed in the P position. When the detent pin 80 is slid from a state of being positioned at the other end side of the elongated hole 82 against the urging force of the compressed coil spring 66 to a state of being positioned at the one end side of the elongated hole 82 by the urging force of the compressed coil spring 66, the distal end portion of the detent pin 80 abuts against the abutting portion 144.

As shown in FIG. 1, the other end portion of the key interlock link 140 functions as a lock portion 146, and enters into the key cylinder 20 via a hole 148 formed in the key cylinder 20. As shown in FIG. 3B, a lock cam 150 is provided in the key cylinder 20, and is integrally rotated by the manual rotation of the ignition key 152 inserted into the key cylinder 20 around the axis of the key cylinder 20 (see FIG. 3A).

Figure 3A:
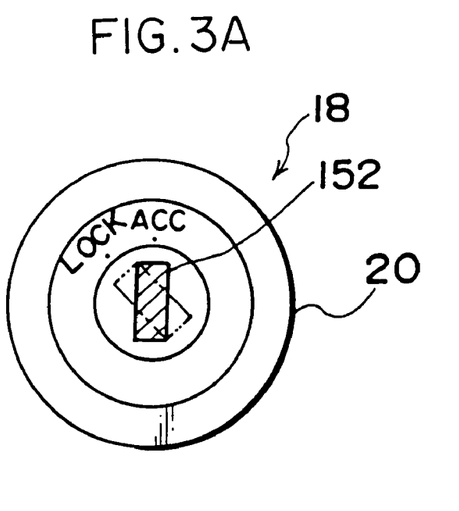
FIG. 3A is a front view showing a key cylinder constituting a key device.
Figure 3B:
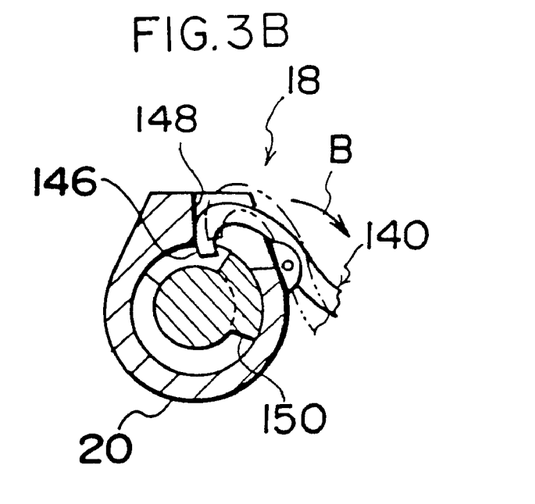
FIG. 3B is a cross sectional view of the key cylinder.

In this case, as shown by a solid line of FIG. 3B, in a state where the lock portion 146 of the key interlock link 140 is inserted into the key cylinder 20, the lock portion 146 is situated on the locus of rotation of the lock cam 150, and when rotating the ignition key 152 from a state in which the ignition key 152 is positioned at an ACC position shown by a solid line in FIG. 3A to a state in which it is situated at a LOCK position (namely, the state shown by a two-dotted chain line in FIG. 3A), the lock portion 146 of the key interlock link 140 is engaged with the lock cam 150 so as to restrict the rotation of the lock cam 150.

Next, the operation and effects of the present embodiment will be described.

In this shift lever apparatus 10, the shift lever 46 is manually rotated (shifted) around the mounting portion 50, and tension is applied to the cable 76 anchored by the pin 74 of the wire anchoring portion 72, or, alternatively, the tension applied to the cable 76 is released. By this action, the automatic transmission 78 is operated. Accordingly, it is possible to shift a shift lever 46 into a shift range from among a plurality of set shift ranges in the vehicle transmission 78 which corresponds to the position to which the shift lever 46 has been moved by a manual shift operation (the shift position).

However, when an attempt is made to shift the shift lever 46 from the "N position" toward the "P position" in FIG. 5, the detent pin 80 abuts against the restricting wall 86 formed in the detent hole 84 and the restricting wall 86 restricts the rotation of the detent pin 80 via the detent hole 84. Therefore, in this state, it is impossible to rotate the detent pin 80 past the "N position" towards the "P position". As a result, it is impossible to change the shift range of the automatic transmission 78 to a shift range corresponding to a rotation position (shift position) which is past the "N position" towards the "P position".

In this state, if the button 58 provided in the knob 52 is pushed, thereby sliding the detent rod 64 until the detent pin 80 is positioned at the other end of the elongated hole 82 against the urging force of the compressed coil spring 66, the detent pin 80 can avoid the restricting wall 86. Therefore, in this state, if the detent pin 80 is manually rotated (shifted) past the "N position" towards the "P position", it is possible to change the shift range of the automatic transmission 78 to a shift range corresponding to the rotation position (shift position) further to the "P position" than the "N position".

Moreover, when the shift lever 46 is manually shifted to the "P position", the detent pin 80 enters into the notch portion 96 of the shift lock plate 88. In this state, when the pressing force on the button 58 is released so that the detent pin 80 is displaced towards one end side of the elongated hole 82, the shift lock plate 88 is slid together with the detent pin 80. Further, in this state, when the supply of current to the coil 112 of the shift lock solenoid 90 is terminated, the coil 112 has no attraction force, and the urging force of the tension coil spring 116 is stronger than the urging force of the tension coil spring 132. Accordingly, the lock member 102 is moved onto the locus of movement of the shift lock plate 88, and restricts the movement of the shift lock plate 88 to the inside of the case 92. In this state, even if the button 58 is pushed, because it is impossible to move the detent pin 80 to a position where it is able to avoid the restricting wall 86, the shift lever 46 cannot be shifted from the "P position" to other shift positions such as the "N position" or the like (shift lock state).

In the state described above, for example, when a predetermined operation such as depressing a brake pedal is performed, the coil 112 of the electromagnet 110 is energized, and the attraction force of the electromagnet 110 is added to the urging force of the tension coil spring 132. The combined force of the attraction force and the urging force is greater than the urging force of the tension coil spring 116. Accordingly, the lock member 102 provided in the plunger 126 is separated from the locus of movement of the shift lock plate 88 enabling the shift lock plate 88 to be moved (shift lock release state).

On the other hand, when the shift lever 46 is positioned in a shift position other than the "P position" such as the "N position" and the like, or when the detent pin 80 is positioned at the other end side of the elongated hole 82 against the urging force of the compressed coil spring 66 even if the shift lever 46 is positioned in the "P position", as shown by the solid line in FIG. 3B, the lock portion 146 of the key interlock link 140 enters into the key cylinder 20 so as to restrict the rotation of the lock cam 150. Accordingly, the ignition key 152 cannot be rotated from the ACC position towards the LOCK position shown in FIG. 3A, and thus it is possible to prevent the removal of the ignition key 152 from the key cylinder 20 (key interlock state).

Figure 2:
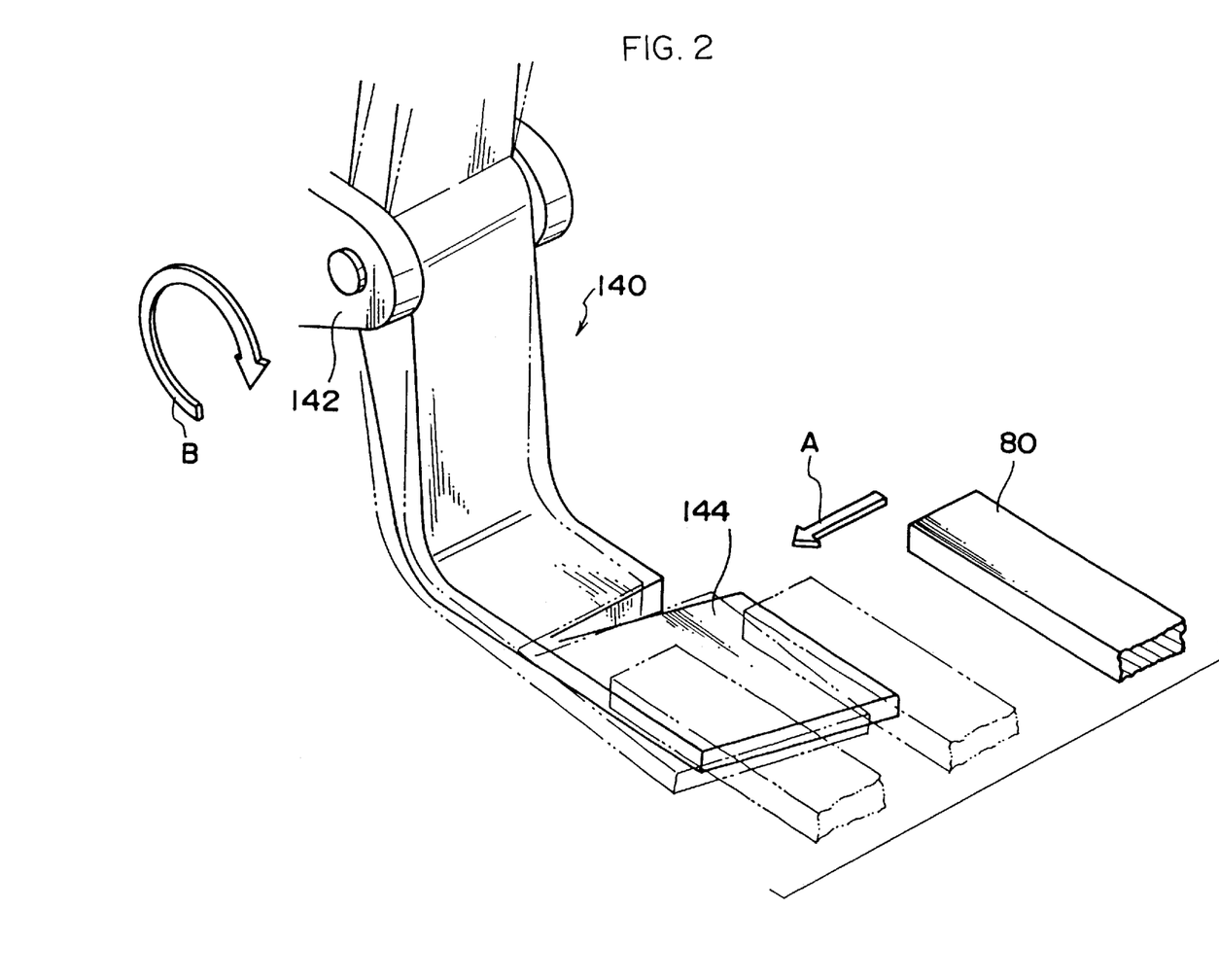
FIG. 2 is an enlarged perspective view showing principal parts of the shift lever apparatus according to an embodiment of the present invention.

In this state, when the shift lever 46 is manually shifted to the "P position", and the pressing force which had been acting until then on the button 58 in order to move the detent pin 80 towards the other side of the elongated hole 82 so as to allow the detent pin 80 to avoid the restricting wall 86 is released, thereby sliding the detent pin 80 towards the one end side of the elongated hole 82 (i.e. sliding the detent pin in the direction indicated by the arrow A, in FIG. 2), the detent pin 80 abuts against the abutting portion 144 of the key interlock link 140 which is positioned on the locus of movement of the detent pin 80, thus pressing the abutting portion 144 downwards. The key interlock link 140 receiving the pressing force from the detent pin 80 is rotated around the supporting portion 142 in the direction indicated by the arrow B, shown in FIG. 2 and FIG. 3B. Accordingly, as shown by the two-dotted chain line of FIG. 3B, the lock portion 146 of the key interlock link 140 is separated from the locus of rotation of the lock cam 150. In this state, because the lock cam 150 is freely rotatable, it is possible to rotate the ignition key 152 from the ACC position towards the LOCK position shown in FIG. 3A, and to extract the ignition key 152 from the key cylinder 20 after the ignition key 152 is rotated to the LOCK position (key interlock release state).

Note that, in the shift lever apparatus 10 of the present embodiment, the shift lever 46 is provided at the side of the key cylinder 20. Therefore, the constituent components relating to the aforesaid key interlock are the detent pin 80 and the key interlock link 140, and in particular, the constituent component relating to the key interlock only is the key interlock link 140 only. Therefore, this serves to reduce the propagation of errors generated due to errors in the size of the parts, and it is possible to reliably carry out the key interlock and key interlock release operations. Further, in the shift lever apparatus 10 of this embodiment, the shift lever apparatus 10 is assembled onto a vehicle with the key interlock link 140 already assembled with the key cylinder 20. Therefore, this serves to do away with troublesome tasks such as the arranging and adjusting of the cables of the conventional shift lever apparatus. As a result, the number of assembly process can be reduced, and a cost reduction can be achieved. Furthermore, as described above, the member required for the key interlock is basically only key interlock link 140; therefore, it is possible to reduce the number of components as compared with the conventional shift lever apparatus, and also, this contributes to a cost reduction.

In this embodiment, the shift lever apparatus 10 has been arranged at the side of the steering wheel. In this case, as in the conventional shift lever apparatus, the shift lever apparatus 10 of this embodiment may be provided between the driver's seat and the passenger seat in a vehicle. In this case, of course, the key cylinder 20 is provided between the driver's seat and the passenger seat in a vehicle.

As is evident from the above description, according to the present invention, by providing the shift lever at the side of the key device, the constituent component required for the key interlock mechanism is basically only the lock link. Therefore, this allows a cost reduction, and also an improvement in the reliability of the key interlock mechanism to be achieved.

What is claimed is:

1. A shift lever apparatus for shifting a shift lever connected to a vehicle transmission into a shift range from among a plurality of set shift ranges in the vehicle transmission which corresponds to a position to which the shift lever has been moved by a manual shift operation comprising:
    a base member onto which one end of a shift lever is pivotally connected;
    a key device which is mounted on said base member adjacent to a side of the shift lever for holding an ignition key which has been inserted inside the key device and which can be operated by being rotated, said key device restricting removal of the ignition key other than at a predetermined removal position; and
    a lock link which restricts rotation of the ignition key to a removal position inside the key device, as well as releases the restriction on the rotation of the ignition key when displaced by a predetermined operation of the shift lever occurring at a specific shift position corresponding to a specific shift range from among the plurality of shift ranges, said lock link being a one-piece member extending between the key device and shift lever,
    wherein said lock link is directly engaged by a portion of said shift lever to displace said lock link to a restricting or releasing position with respect to said rotation of said ignition key.

2. The shift lever apparatus according to claim 1 further comprising:
    a detent pin connectable to the shift lever so as to protrude therefrom towards the key device side, which detent pin is able to move integrally with the shift lever in the manual shift operation direction, and which detent pin moves in a direction orthogonal to the manual shift operation direction when a predetermined release operation is carried out; and
    a detent section formed in a wall interposed between the shift lever and the key device, in which is provided a detent hole into which the distal end of the detent pin is inserted, with a restricting section formed inside the detent hole for restricting movement of the detent pin by abutting the detent pin on the locus of the movement of the detent pin which accompanies a manual shift operation of the shift lever to the specific shift position and restricts movement of the detent pin, and which restricting section is able to be avoided by the detent pin via a specific release operation, wherein
        when the shift lever is positioned in a specific shift position; the detent pin, having avoided the restricting section, engages with the lock link when the detent pin returns to a state before the release operation was performed, and displaces the lock link to a position at which the restriction on the rotation of the ignition key is released.

3. The shift lever apparatus according to claim 1, wherein the base member includes a supporting portion for said shift lever and the lock link includes an end extending proximate the supporting portion, and bends in a direction so as to abut an end of a detent pin of said lever.

4. The shift lever apparatus according to claim 1, wherein the shift lever is supported by a substantially box-shaped supporting portion provided in said base member having a pair of supporting walls disposed facing each other and a bottom portion.

5. The shift lever apparatus according to claim 3, wherein the shift lever is rotatably supported around a shaft penetrating the shift lever supporting portion, and comprises a mounting portion for being mounted to the shaft, an operating mechanism for operating the shift lever, and a shift lever main body.

6. The shift lever apparatus according to claim 3, further comprising a shift lock device mountable to a part of the supporting portion and a fastening means for mounting the shift lock device to said part.

7. The shift lever apparatus according to claim 2, in which the detent section is formed in a wall of the base member.

8. The shift lever apparatus according to claim 2, wherein the shift lever includes a supporting portion and the detent section constitutes a part of the supporting portion of the shift lever.

9. The shift lever apparatus according to claim 3, wherein the key device includes a key cylinder having an outer peripheral portion, and the lock link is interposed between the key cylinder and a part of the supporting portion, and is supported by a supporting member formed on the outer peripheral portion of the key cylinder so as to be rotatable over a predetermined range around an axis generally along a longitudinal direction of a vehicle.

10. The shift lever apparatus according to claim 3, further comprising a shift lock device mountable to a part of the supporting portion of the shift lever, and a fastening means for mounting the shift lock device to said part.

11. The shift lever apparatus according to claim 2, wherein the lock link includes an end extending proximate a supporting portion, and bends in a direction so as to but an end of the detent pin.

12. The shift lever apparatus according to claim 4, further comprising a shift lock device mountable to a part of the supporting portion of the shift lever, and a fastening means for mounting the shift lock device to said part.

13. The shift lever apparatus according to claim 4, further comprising:
  a detent pin connectable to the shift lever so as to protrude therefrom towards the key device side, which detent pin is able to move integrally with the shift lever in the manual shift operation direction, and which detent pin moves in a direction orthogonal to the manual shift operation direction when a predetermined release operation is carried out; and
  a detent section interposed between the shift lever and the key device, in which is formed a detent hole into which the distal end of the detent pin is inserted, with a restricting section formed inside the detent hole for restricting movement of the detent pin by abutting the detent pin on the locus of the movement of the detent pin which accompanies a manual shift operation of the shift lever to the specific shift position and restricts movement of the detent pin, and which restricting section is able to be avoided by the detent pin via a specific release operation, wherein
    when the shift lever is positioned in a specific shift position, the detent pin, having avoided the restricting section, engages with the lock link when the detent pin returns to a state before the release operation was performed, and displaces the lock link to a position at which the restriction on the rotation of the ignition key is released.

14. The shift lever apparatus according to claim 5, further comprising a shift lock device mountable to a part of the supporting portion, and a fastening means for mounting the shift lock device to said part.

15. The shift lever apparatus according to claim 5, further comprising:
  a detent pin connectable to the shift lever so as to protrude therefrom towards the key device side, which detent pin is able to move integrally with the shift lever in the manual shift operation direction, and which detent pin moves in a direction orthogonal to the manual shift operation direction when a predetermined release operation is carried out; and
  a detent section interposed between the shift lever and the key device, in which is formed a detent hole into which the distal end of the detent pin is inserted, with a restricting section formed inside the detent hole for restricting movement of the detent pin by abutting the detent pin on the locus of the movement of the detent pin which accompanies a manual shift operation of the shift lever to the specific shift position and restricts movement of the detent pin, and which restricting section is able to be avoided by the detent pin via a specific release operation, wherein
    when the shift lever is positioned in a specific shift position, the detent pin, having avoided the restricting section, engages with the lock link when the detent pin returns to a state before the release operation was performed, and displaces the lock link to a position at which the restriction on the rotation of the ignition key is released.

16. The shift lever apparatus according to claim 15 wherein the detent section is formed in said base member.

17. The shift lever apparatus according to claim 6, further comprising:
  a detent pin connectable to the shift lever so as to protrude therefrom towards the key device side, which detent pin is able to move integrally with the shift lever in the manual shift operation direction, and which detent pin moves in a direction orthogonal to the manual shift operation direction when a predetermined release operation is carried out; and
  a detent section interposed between the shift lever and the key device, in which is formed a detent hole into which the distal end of the detent pin is inserted, with a restricting section formed inside the detent hole for restricting movement of the detent pin by abutting the detent pin on the locus of the movement of the detent pin which accompanies a manual shift operation of the shift lever to the specific shift position and restricts movement of the detent pin, and which restricting section is able to be avoided by the detent pin via a specific release operation, wherein
    when the shift lever is positioned in a specific shift position, the detent pin, having avoided the restricting section, engages with the lock link when the detent pin returns to a state before the release operation was performed, and displaces the lock link to a position at which the restriction on the rotation of the ignition key is released.

18. The shift lever apparatus according to claim 17 in which the detent section is formed in a wall of said base member.

19. A shift lever apparatus for shifting a shift lever connected to a vehicle transmission into a shift range from among a plurality of set shift ranges in the vehicle transmission which corresponds to a position to which the shift lever has been moved by a manual shift operation comprising:
  a base member having a supporting portion formed from first and second supporting walls onto which one end of a shift lever is pivotally connected; and
  a key device which is mounted on said first supporting wall of said supporting portion of said base member adjacent to a side of the shift lever for holding an ignition key which has been inserted inside the key device and which can be operated by being rotated, said key device restricting removal of the ignition key other than at a predetermined removal position; and
  a lock link which restricts rotation of the ignition key to a removal position inside the key device, as well as releases the restriction on the rotation of the ignition key when displaced by a predetermined operation of the shift lever occurring at a specific shift position corresponding to a specific shift range from among the plurality of shift ranges,
  wherein said lock link is directly engaged by a portion of said shift lever to displace said lock link to a restricting or releasing position with respect to said rotation of said ignition key.

* * * * *